June 24, 1947.　　　J. P. TARBOX　　　2,423,055
BRAKE MOUNTING
Filed Dec. 14, 1944　　　2 Sheets-Sheet 2

INVENTOR
John P. Tarbox

Patented June 24, 1947

2,423,055

UNITED STATES PATENT OFFICE 2,423,055

BRAKE MOUNTING

John P. Tarbox, Philadelphia, Pa., assignor to The Budd Company, Philadelphia, Pa., a corporation of Pennsylvania Application December 14, 1944, Serial No. 568,097

3 Claims. (Cl. 188—59)

The invention relates to a brake mechanism and particularly to such a mechanism adapted to be applied to vehicles, such as railway trucks.

Such trucks usually have two longitudinally spaced wheel and axle assemblies supporting the truck frame. In such trucks, brake mechanism of the disc type has usually been disposed inwardly of the wheel and axle assemblies, i. e., toward the center of the truck frame, and between the respective wheel and axle assemblies and the adjacent transom of the frame. In this location, the parts of the brake mechanism are relatively inaccessible for servicing, replacement or repair, particularly when the rail car is mounted on the truck.

It is a primary object of the invention to provide greater accessibility to the brake mechanism at all times and to this end, instead of arranging the brake supports inwardly of the wheel and axle assemblies it is proposed to arrange them outwardly thereof, i. e., toward the ends of the truck.

Another object of the invention is simplicity of construction and ready removability of the entire mechanism, excepting the rotary elements of the mechanism, as a unit from the truck frame.

Other and further objects and advantages and the manner in which they are attained will become apparent from the following detailed description when read in connection with the drawings forming a part of this specification.

Figure 1:
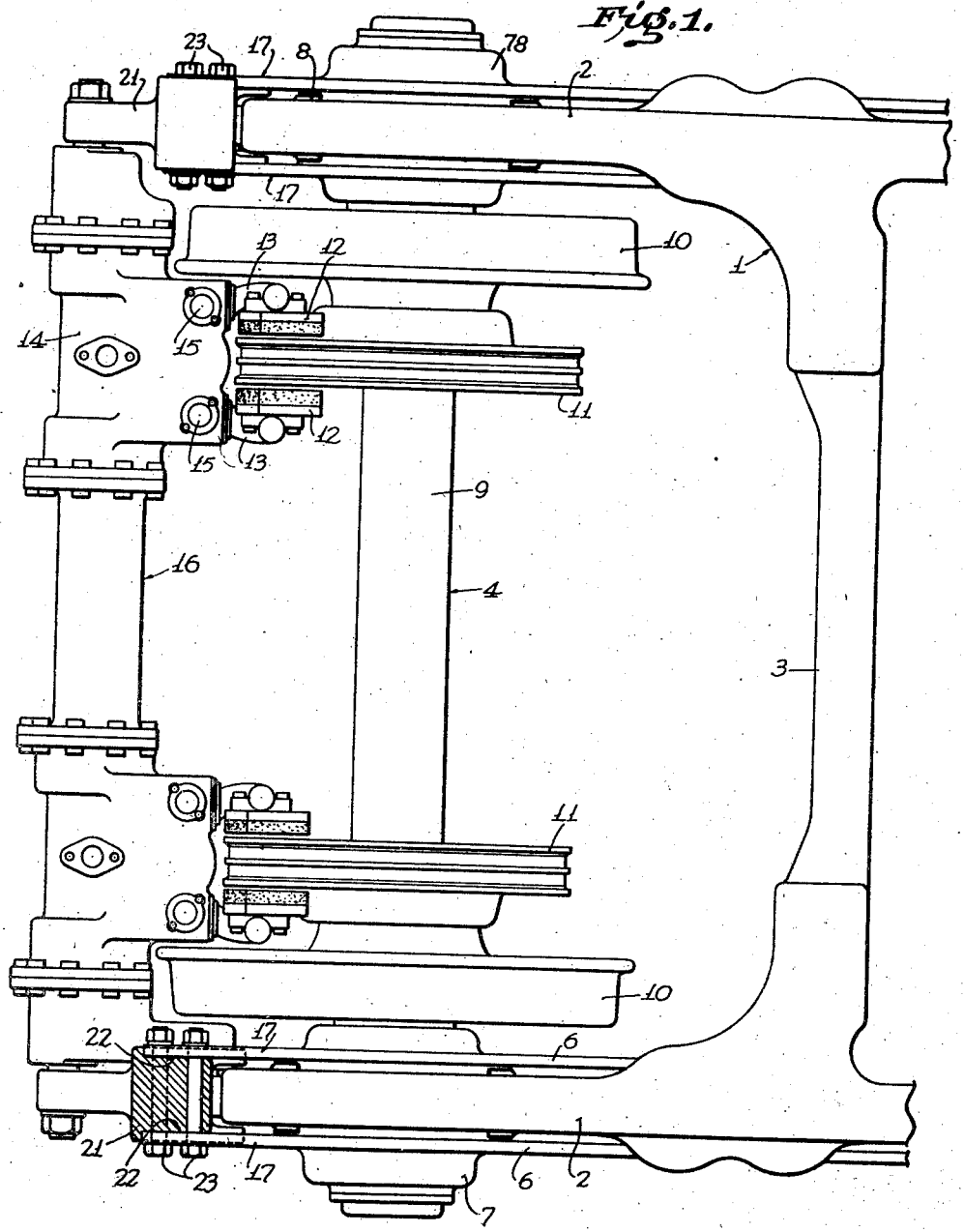
Fig. 1 is a plan view of one-half of a railway truck showing the invention applied thereto, parts being broken away and shown in section.
Figure 2:
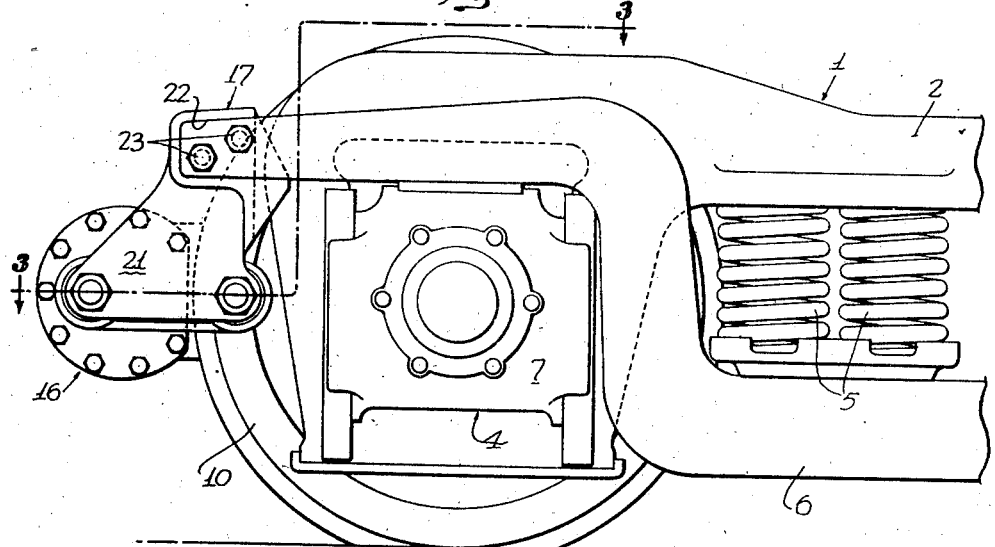
Fig. 2 is a side elevational view of the parts shown in Fig. 1.
Figure 3:
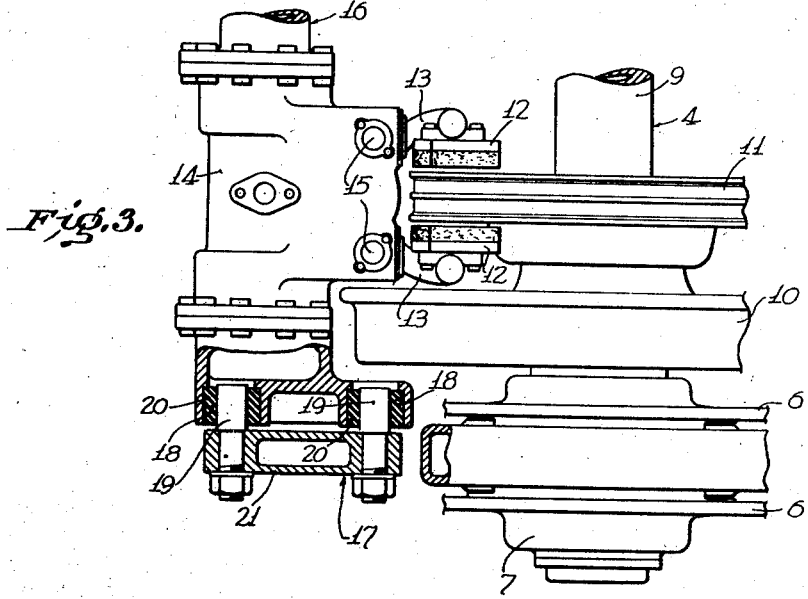
Fig. 3 is a fragmentary plan view, with parts shown in horizontal section, the view being taken substantially along the line 3—3 of Fig. 2.

In the embodiment of the invention selected for illustration, 1 designates the truck frame having side members 2 and transoms, as 3. The frame is supported from the spaced wheel and axle assemblies, as 4, in a usual manner, being spring supported by spring nests, as 5, from the lateral equalizers 6, 6 which in turn rest on top of the journal boxes 7, 7 adjacent the ends of the wheel and axle assemblies 4. The frame is guided with respect to the journal boxes by the usual pedestal guides 8, 8.

The equalizers 6, 6 in this embodiment are of the usual double parallel bar type, but it will be understood that the invention is equally applicable to the trucks equipped with single bar type of equalizers.

The wheel and axle assembly 4, in addition to the journal boxes 7, 7 also comprises the axle 9 journalled at its ends in the respective boxes and the pair of wheels 10, 10, one located adjacent each journal box.

With each wheel of the assembly is associated and secured to rotate therewith, a rotary brake member, such as the disc 11. Arranged in cooperative relation with each disc is a pair of non-rotary brake elements or shoes 12, 12, pivotally supported by brake levers, 13, 13, which extend into a cylinder housing 14 and are pivoted therein at 15, 15 and adapted to be actuated by an actuating cylinder within the housing. The cylinder housing, levers and shoes form a unit, such as is fully disclosed and claimed in copending application Serial No. 399,779 for Brake mechanism, filed June 16, 1941, now Patent No. 2,413,614, issued December 31, 1946, and need not be described in detail herein. This unit forms a part of a transversely extending support member, designated generally by numeral 16, arranged outwardly of the adjacent wheel and axle assembly, and flexibly supported at its ends from the ends of said assembly.

According to my invention the brake support member is carried by end extensions 17, 17 of the equalizers 6, 6 projecting outwardly beyond their points of support on the respective journal boxes, i. e., at the ends of the truck instead of between the axles.

To permit of the relative movement between the equalizers due to the tilting of the axle or axles without unduly straining the parts, the brake support member is connected to the equalizer extensions at one end by extended flexible joints generally similar to the connection disclosed and claimed in copending application Serial No. 435,278, filed March 19, 1942, Patent No. 2,365,460, December 19, 1944, and at the other end by a single socket. Suffice it to say that the joint at the one end comprises a pair of spaced sockets, as 18, 18, on one of the joined members, in this case the transverse support member 16, and corresponding pins 19, 19 extending into the respective sockets and carried by the adjacent equalizer end extension 17. At the other end there is but a single socket 18 and coacting pin 19. Between each of the pins and its respective socket is interposed, preferably under some compression, a rubber bushing 20.

To facilitate the removal and replacement of the transverse support members, together with the joint structures just described, as a unit, the end extensions 17 of the equalizers are constructed of two readily demountable parts. The part carrying the joint structure is shown as comprising a bracket 21 having sockets 22 on its opposite sides which can be readily slipped over the projecting integral end portions of the two parallel bars forming the adjacent equalizer 6, and bolted thereto by the bolts 23.

With a brake of the class described, since the shoes are mounted on the support member in offset relation toward the axle of the adjacent wheel and axle assembly, when the brakes are applied, torque is developed in the support per se, and this torque is counteracted solely by the extended flexible joint structures through which the support member is carried from the wheel and axle assembly by the equalizer and extensions.

It will be seen that the brake arrangement herein described lends itself to easy incorporation in existing truck structures with a minimum of modification thereof, and provides a maximum of accessibility at all times for servicing and repair or replacement. Furthermore, replacement and manufacture are facilitated by the ready demountability of the brake support, including the flexible joint structures, from the truck.

While a specific embodiment of the invention has been described herein in detail, it will be understood that changes and modifications will readily occur to those skilled in the art without departing from the main features of the invention and such changes and modifications are intended to be covered in the appended claims.

What is claimed is:

1. In a brake arrangement, a wheel and axle assembly, equalizers supported from the opposite ends thereof and having end extensions beyond their points of support on said assembly, a rotary brake disc secured to said assembly, brake shoes in cooperative relation to said disc and operating means therefor, and a transversely extending brake support member carrying said shoes and their operating means and arranged wholly outwardly of said assembly, and connected by articulated joints to the end extensions of said equalizers, the shoes being supported from said members in offset relation toward the axle of said assembly whereby a braking torque is developed in said member per se, the joints being arranged to wholly counteract said developed braking torque yet to permit free relative oscillation of said equalizers.

2. In a brake arrangement for a vehicle, a wheel and axle assembly supporting one end of said vehicle, a brake disc carried by said assembly, brake shoes in cooperative relation to said disc and operating means therefor, equalizers supported from the opposite ends of said assembly, and a transversely extending brake support member carrying said shoes and their operating means and arranged wholly outwardly of said assembly toward the end of the vehicle supported thereby, and supported through articulated joint structures from the ends of said equalizers, the shoes being supported from said member in offset relation toward the axle of said assembly whereby a braking torque is developed in said member per se, the joint structures being arranged to wholly counteract said developed braking torque.

3. In a brake arrangement, a wheel and axle assembly, equalizers supported from the opposite ends thereof and having end extensions comprising brackets removably secured to the respective equalizers, said extensions projecting beyond the points of support of said equalizers on said assembly, a rotary brake disc secured to said assembly, brake shoes in cooperative relation to said disc and operating means therefor, and a transversely extending brake support member arranged wholly outwardly of said assembly and connected by extended articulated joints to said removable brackets, said extended joints being arranged to wholly counteract the developed braking torque yet to permit free relative oscillation of said equalizers.

JOHN P. TARBOX.

REFERENCES CITED

The following references are of record in the file of this patent:

UNITED STATES PATENTS

| Number | Name | Date |
| --- | --- | --- |
| 2,276,337 | Pflager | Mar. 17, 1942 |
| 2,352,222 | Pogue et al. | June 27, 1944 |
| 2,359,805 | Tack | Oct. 10, 1944 |
| 2,365,460 | Eksergian et al. | Dec. 19, 1944 |